Nov. 23, 1948.    J. B. WHITMORE ET AL    2,454,362
AUTOMATIC MOLDING PRESS

Filed April 21, 1942    5 Sheets-Sheet 1

INVENTORS
J. B. WHITMORE
W. MAKENNY
F. A. NEWCOMBE
BY
ATTORNEY

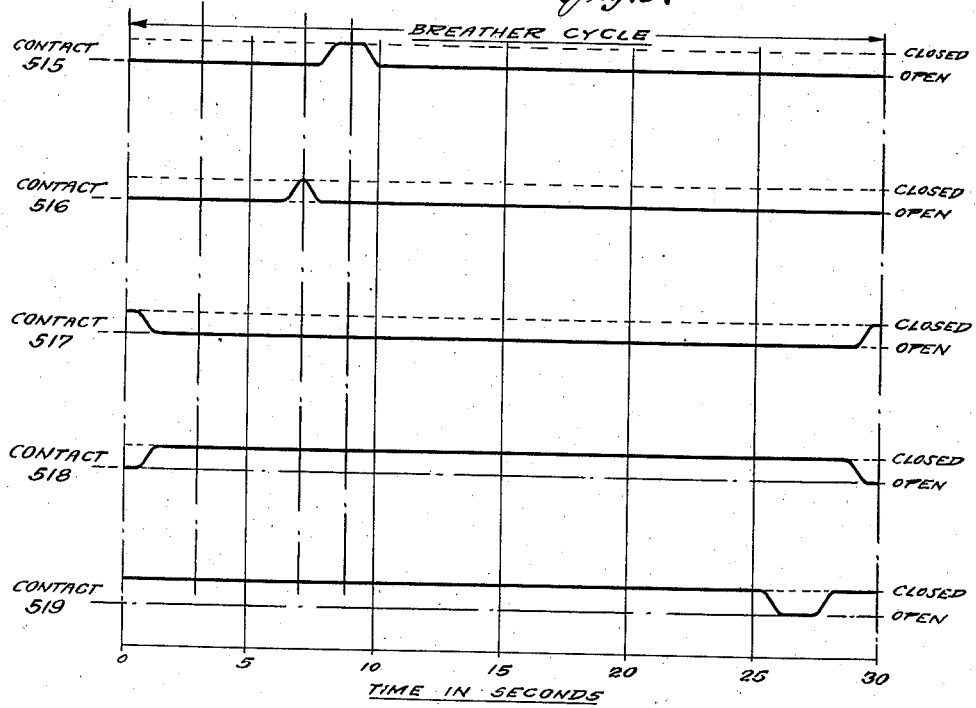
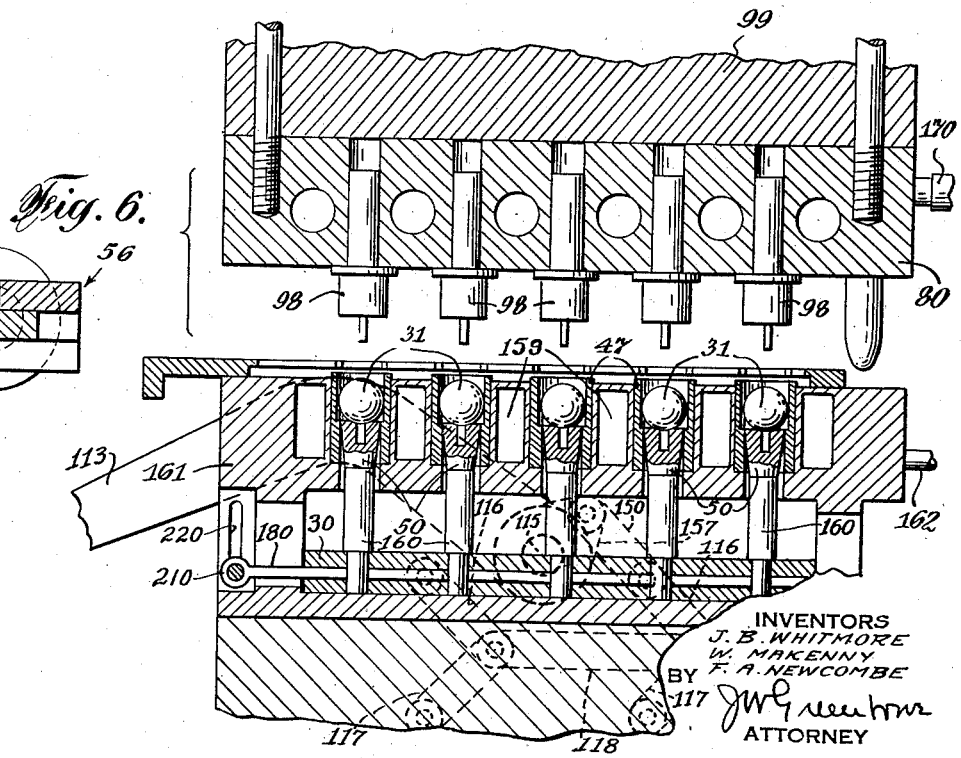

Nov. 23, 1948. J. B. WHITMORE ET AL 2,454,362
AUTOMATIC MOLDING PRESS
Filed April 21, 1942 5 Sheets-Sheet 3
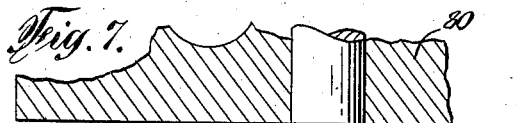
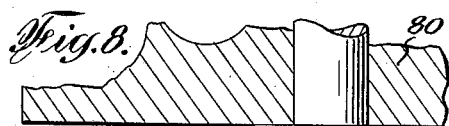
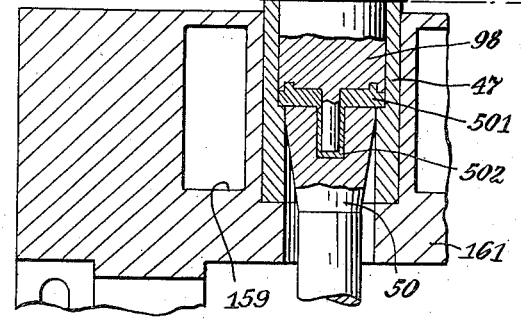
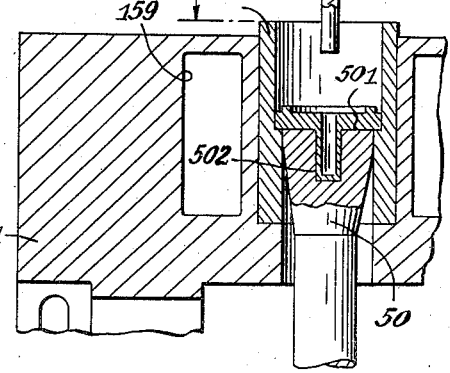
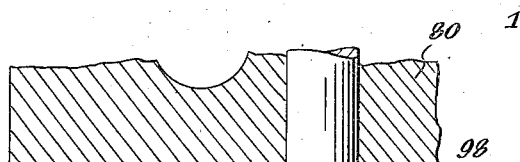
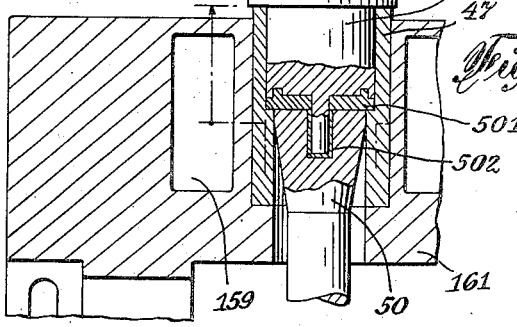
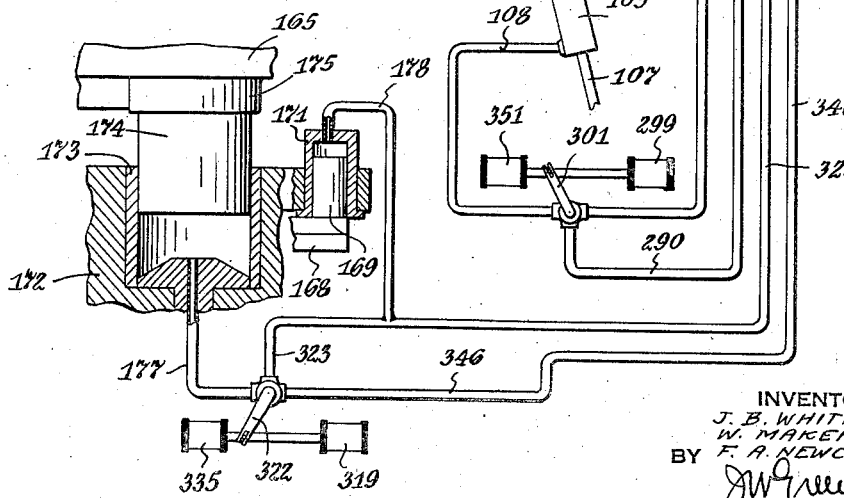
INVENTORS
J. B. WHITMORE
W. MAKENNY
BY F. A. NEWCOMBE
ATTORNEY Nov. 23, 1948.    J. B. WHITMORE ET AL    2,454,362
AUTOMATIC MOLDING PRESS
Filed April 21, 1942    5 Sheets-Sheet 4
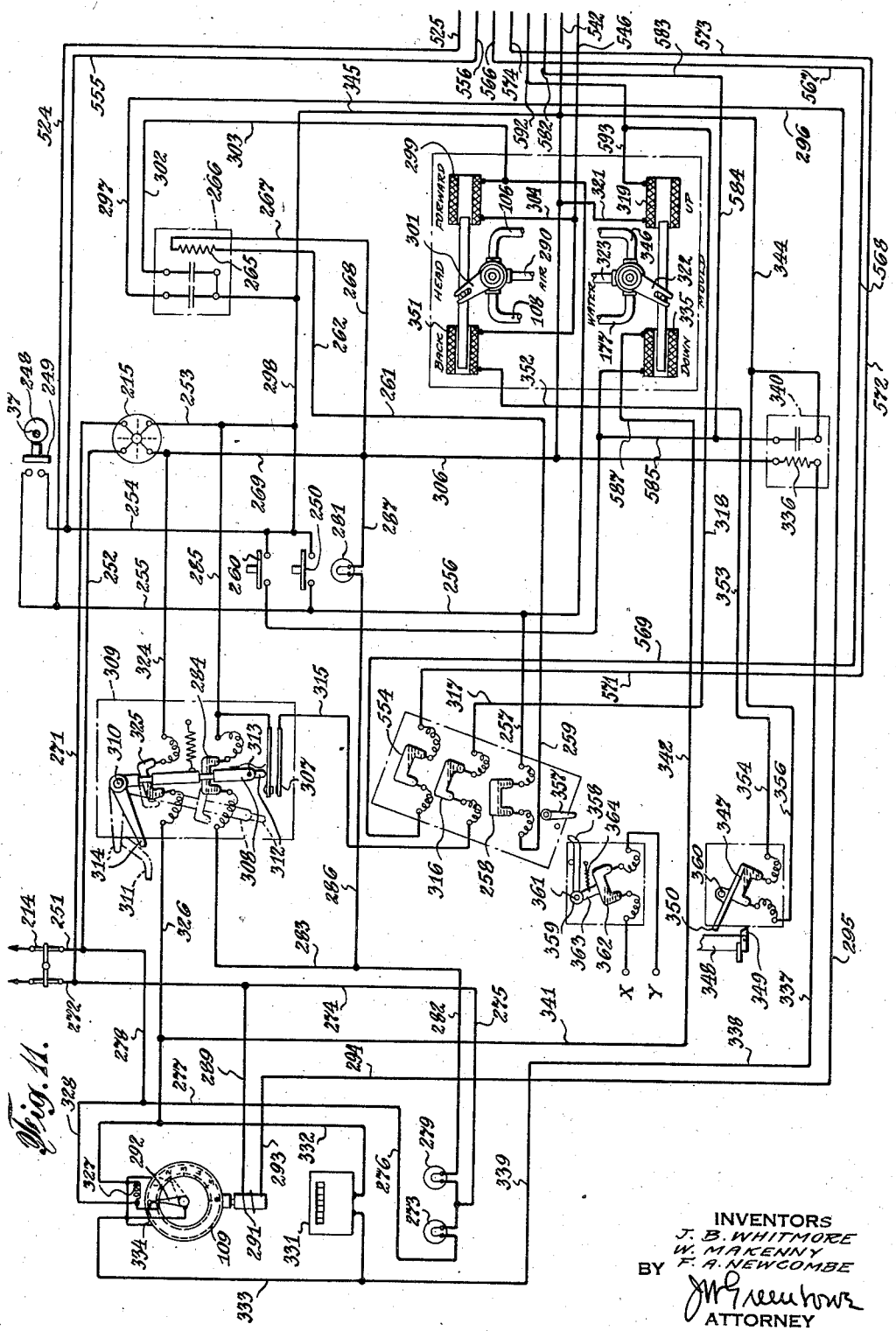
INVENTORS
J. B. WHITMORE
W. MAKENNY
F. A. NEWCOMBE
BY
[signature]
ATTORNEY

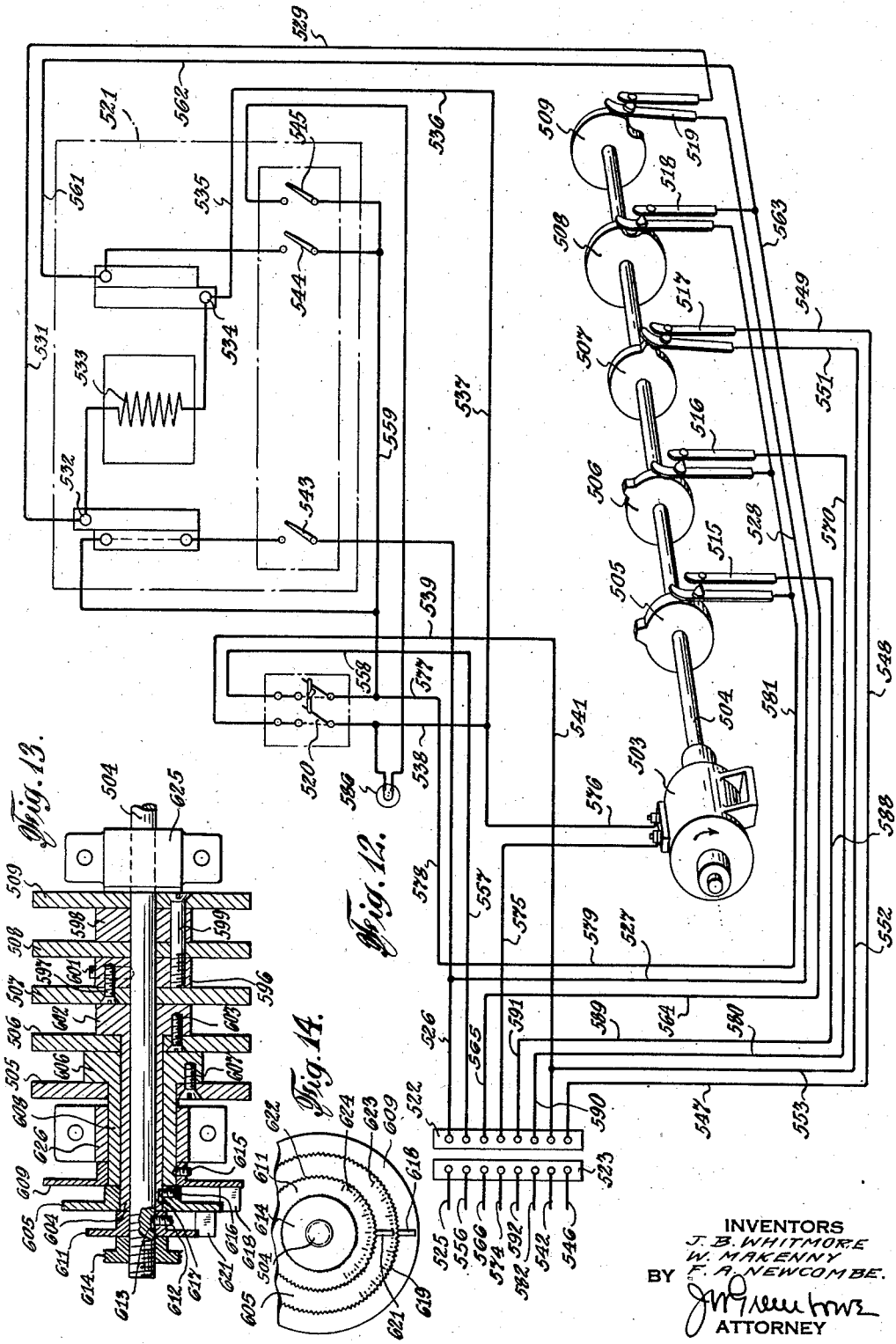

Patented Nov. 23, 1948

2,454,362

UNITED STATES PATENT OFFICE 2,454,362

AUTOMATIC MOLDING PRESS

James B. Whitmore, Bloomfield, William Makenny, Mountain View, and Frank A. Newcombe, Nutley, N. J., assignors to Westinghouse Electric Corporation, East Pittsburgh, Pa., a corporation of Pennsylvania Application April 21, 1942, Serial No. 439,893

4 Claims. (Cl. 18—17)

1

This invention relates to the art of molding plastic materials of the phenol resin type, such as that known in the art as "Bakelite," and more particularly to the art of molding articles such as radio tube bases. This invention is an improvement over the inventions described and claimed in the Makenny et al. Patent No. 2,197,528, dated April 16, 1940, and the Whitmore et al. application, Serial No. 386,790, filed April 4, 1941, now Patent No. 2,409,725, and owned by the assignee of the present application.

One of the objects of the present invention is to provide an improved control means for automatically operating a molding press.

Another object is to provide the molding press means of said Makenny et al. patent referred to with an electrically energized control for automatic operation of said press means in the molding of a plurality of lug type radio tube bases, said control providing for, in addition to the sequence of operations provided by the control of the application above referred to, the venting of gases from the mold interior and the moldable material while the latter is in a plastic condition.

A further object is to provide means for the automatic control of the press of said Makenny patent in the molding of lug-type radio tube bases.

Other objects and advantages will be apparent as the invention is more fully hereinafter disclosed.

In accordance with these objects we have devised the control means illustrated in the accompanying drawings, wherein:

Fig. 3 is a diagram illustrating the sequence of switch closing operations provided in accordance with our invention and which modify the sequence of operations provided by the control means of the copending application referred to;

Fig. 6 is an enlarged fragmentary view showing a plurality of the co-acting molding elements of the machine of Fig. 1 in the first operating position of the cycle controlled by means of the present invention, showing a portion of the loading board to the left of the press;

Fig. 7 is a further enlarged fragmentary sectional view illustrating the relative positions of one pair of the co-acting molding elements of the press means of Fig. 1, in the second operating

Figure 1:
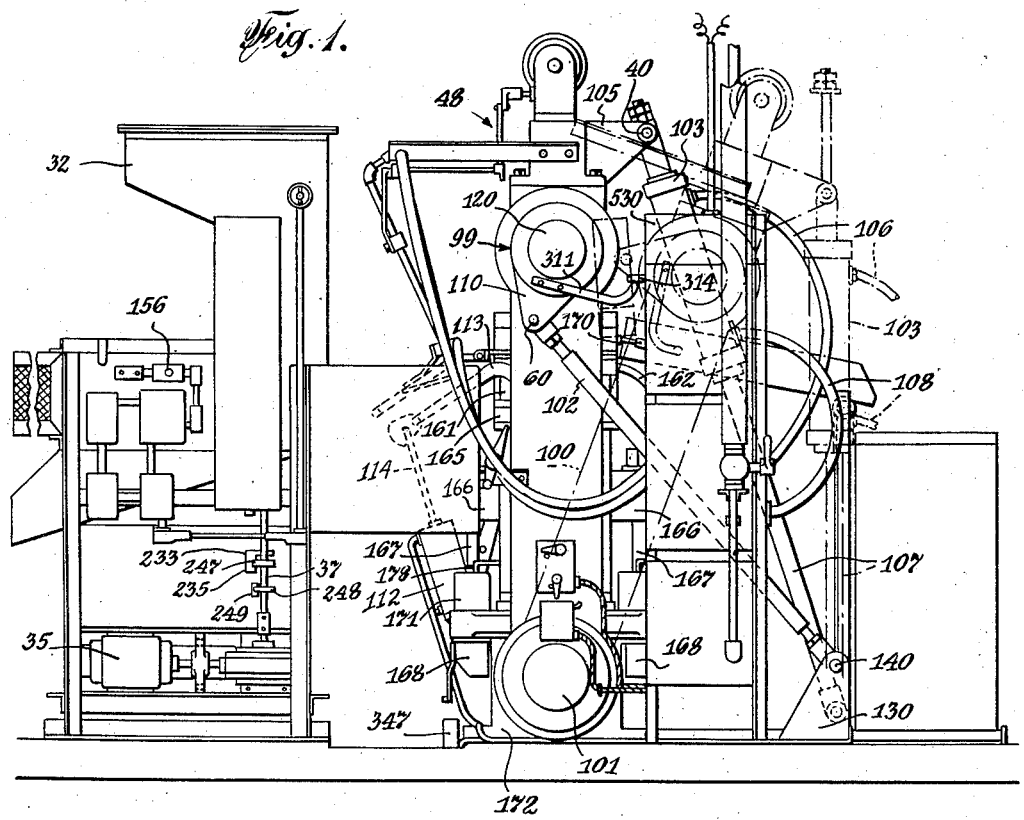
Fig. 1 is a side elevational view of a complete machine embodying our invention, for simultaneously molding a plurality of radio tube bases from plastic material.

2 position of the cycle through which said parts are to be moved;

Fig. 8 is a similar view showing the same pair of co-acting molding elements in the third operating position of said cycle;

Fig. 9 is a similar view showing the same pair of co-acting molding elements in the fourth operating position of the cycle;

Fig. 10 is a piping diagram for the air and hydraulic press mechanism of the machine of Fig. 1;

Fig. 11 is a wiring diagram of the control means for the molding press and timer, including some of the control circuits of the present invention;

Fig. 12 is a wiring diagram of the control means of the present invention, with its associated electrically actuated mechanical switch operating means illustrated in perspective and in operating relation to the wiring circuits, and with its terminals extended to be connected electrically to several extensions indicated in Fig. 11;

Fig. 13 is an axial sectional view of the switch operating means or cams, which are merely diagrammatically illustrated in perspective in Fig. 12; and Fig. 14 is a fragmentary end elevational view of said means, from the left as shown in Fig. 13.

In the molding of articles from plastic material known in the art as phenol resins, of which the material known as "Bakelite" is typical, the material is molded under pressure to the desired shape while subjected to a desired temperature for a time interval effective to "set" the particles.

Figure 4:
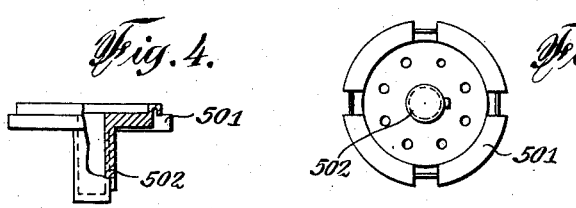
Fig. 4 is a side elevational view, partly in section, of a radio tube base adapted to be formed in the machine illustrated in Fig. 1.
Figure 5:
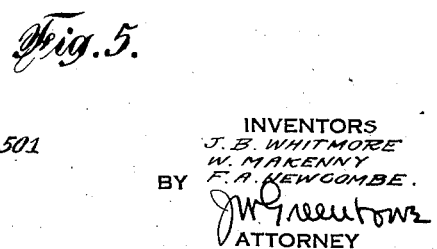
Fig. 5 is a plan of said radio tube base.

In the molding of cup-shaped and substantially disc-shaped radio tube bases by this general method, employing the machine of the above-identified Makenny et al. patent and the control means of the referred-to application for the automatic operation of the same, no particular difficulty is experienced from entrapped gases due, it is believed, to the fact that such bases are sufficiently "open" that venting passageways are provided for such gases. Where, however, bases 501 are formed with a hollow cylindrical closed end lug portion 502, as illustrated in Fig. 4, the entrapped gases must be vented in order to avoid the formation of blisters and similar defects in the final molded product.

The venting of such gases is best effected at the conclusion of the pressure molding operation and during the early stages of the heating cycle while the material is in a very soft plastic state. It is most conveniently accomplished by the opening of the molding press for a brief time interval to permit the escape of the gases. The present invention provides a modified electrically-energized cycle-control mechanism, somewhat like that disclosed in the application referred to, whereby this object may be accomplished.

The cycle-control mechanism employed operates motors, solenoid air valves, and switches at the proper time to cause the machine to function properly. Broadly speaking, the functions performed by the disclosed embodiment of our invention, merged with part of that of the application referred to, are as follows:

1. Assuming a loading hopper contains a supply of pellets or tablets of plastic material, these pellets are fed, a few at a time, to distributor plates in the bottom of said hopper, as illustrated generally in Figure 6 of said application.

2. A charge of pellets is delivered through said distributor plates to a loading board 56 carried on wheels, while the same is disposed beneath said hopper, as illustrated most clearly in Figures 12 and 13 of said application.

3. The loading board 56 is moved from beneath the loading hopper to above the lower mold elements of the molding press, as shown most clearly in Figure 15 of said application.

4. The pellets are dropped from the loading board 56 into the lower mold elements of the press, as shown most clearly in Figure 16 of said application.

5. The loading board 56 is moved back (see Fig. 6) to recharging position illustrated most clearly in Figures 6, 12 and 13 of said application.

6. The upper head of the press, carrying the upper mold elements, swings forward from the position shown in Figure 4 of said application, to that over the lower mold elements, as shown most clearly in full lines in Figure 1 of the present case.

7. The lower mold elements are raised to compress the pellets between the upper and lower mold elements, as shown most clearly in Figure 7.

8. Instead of holding the lower mold elements against the upper mold elements for the full molding and heat-treating period, as in said earlier application, our improvement, which we call a press "cycle controller," now comes into play and the lower mold elements are lowered as shown in Fig. 8, almost immediately after closing, to release trapped gas from the molds and moldable material, the latter of which at this time is very soft and plastic.

9. The lower mold elements are, almost immediately thereafter raised into molding engagement with the upper mold elements, as shown in Fig. 9 where they stay until the end of the full molding and heat-treating period, as in the application referred to.

10. The lower mold elements are lowered to initial position.

11. The upper head of the press, and mold elements carried thereby, swings back to its initial position to uncover the molded articles and permit their removal.

Delivery of pellets to lower mold elements

The pellets on tablets 31 of plastic material may be delivered to the lower mold elements, as described on pages 9 to 12, inclusive, of said earlier application referred to, or by hand. They are preferably delivered automatically as one of the important advantages of our present invention is to make possible the use of only one pellet per lug type radio tube base or similar article, while still avoiding the formation of blisters due to trapped gas. Lug type bases may be made without blisters, even if our invention is not employed, but it is then necessary to put a small pellet of the moldable material in the lug cavity and a large one thereabove in the shell cavity. The specific loading mechanism of said earlier application is not adapted to handle two sizes of pellets.

Swinging of press head

Upon the pellets 31 being dropped into the lower mold elements 47 of the mold block 161, as indicated in Figure 6, the loading board 56, if used, is moved back to recharging position, illustrated in Figures 6, 12 and 13, of said earlier application, and the upper mold elements 98 mounted in the hollow upper mold block or plate 80 of the press 48, are moved from their rearward or retracted position, indicated in full lines of Figure 4 of said earlier application, and in dot-dash lines in Figure 1 of the present application, to their forward or operative position indicated in full lines in said Figure 1.

The hollow mold block or plate 80 is heated by steam from pipe 170, and bolted or otherwise secured to a tilting head 99, which is mounted to swing on connecting side plates 100 about trunnions 101 and, at the same time, be tilted with respect to said plates on trunnions 120 by means of rods 102 (Figure 1). The upper ends of said rods 102 are pivoted each to an extension or crank 110 on a trunnion 120 of the tilting head 99, as indicated at 60, and the lower end of which is pivoted to a bracket 130, as indicated at 140. Movement of the side plates 100 is effected by means of an air cylinder 103, pivoted to a bracket 105 secured thereon, as indicated at 40. Said cylinder is carried on a piston and associated rod 107 and is moved from near one end to near the other of said rod by air pressure. Pipe 106 supplies compressed air to the upper portion of the cylinder 103 to move the same upwardly along the piston rod 107, swinging the pivoted side plates 100 from tilted position shown in dot-dash lines in Figure 1 to upright position shown in full lines in said figure. A return of the pivoted plates 100 is effected by compressed air through pipe 108, which acts under the piston and moves the cylinder back to the position shown in dot-dash lines in Figure 1.

Operation of lower elements

When the upper mold elements 98 are positioned directly over the lower mold elements 47, as shown in Figure 6, said lower mold elements are raised from the position shown in full lines to that shown in dotted lines in Figure 4, of said earlier application, or from that shown in Figure 6 to that shown in Figure 7 of the present application, to shape the pellets of plastic material between the upper and lower mold elements for a definite period determined by the timing device or clock 109 (Figure 11), while the lower mold elements are also heated by steam introduced, into the interior passages 159 of the supporting lower mold block or frame 161, through pipe 162.

The lower mold block 161 is mounted on a ram 165 (Figures 1 and 10), carrying ears 166 to which extend studs 167 from cross members 168 which serve for lowering or returning said ram. Such return is effected by pistons 169 carried by said cross members and operating in cylinders 171 carried by the base casting 172 of the press.

The base casting 172 carries the lifting cylinder 173, for the lower mold elements, in which is adapted to reciprocate the lifting piston 174, on the upper portion 175 of which is mounted the ram 165. The lowermost and uppermost positions of the ram are determined by a cross frame stop portion of the base casting 172. Water or other liquid is admitted to the lifting cylinder 173 through supply pipe 177 and to the return cylinders 171 through the supply pipe 178.

In accordance with the present invention, the lower mold elements are not allowed to immediately stay in engagement long with the upper mold elements, as shown in Figure 7, but at this point the sequence of operations described in said earlier application is interrupted for a short time interval, say about thirty (30) seconds, and the following operations are performed under the control of the means illustrated in Figure 12, following which the press may be operated as described in said application.

The new operations comprise:

(a) Movement of the lower mold elements 47 downwardly from the level shown in Figure 7 to a lower level, as shown in Figure 8.

(b) A prompt return movement of the lower mold elements 47 to the higher level from which it was moved, as shown in Figure 9, where it stays for the remainder of the heat-treating time interval determined by the clock 109.

This vertical up and down movement of the lower mold elements 47 is accomplished by actuation of the same means heretofore provided and employed in combination with the electrical control means of Figures 11 and 12, and effects a venting of the gases from the moldable material and molds in accordance with the present invention.

When the said time interval has passed, the lower mold elements 47 are dropped again to the position shown in Figure 8, and the lower portions or name plates 50, telescoped with outer or shell portions of said lower mold elements, in the present instance provided with upwardly opening pockets to form the closed end lug portions 502 of the bases 501 and forming the lower portions of said lower mold elements, are raised with respect to said shell portions as in accordance with said earlier application or in any desired manner, to lift the molded articles for removal by compressed air or other desired means.

If the operation is in accordance with that of our earlier application referred to, the name plates 50 are lifted to eject the molded articles by means of a piston operating in a cylinder 112, through connected piston rod 114 to lower the side levers 113 about their pivots 115, and thereby actuate parallel-motion lifting mechanism, consisting of two sets of lifting links 116 and 117 and a connecting member 118, through links 150 pivoted to extensions 157 of the levers 113. The upper ends of the links 116 are directly pivoted to a plate 30 to which the name plate stems 160 are secured, as by means of rods 180 passing through apertures in reduced lower end portions thereof, after being dropped into position as illustrated in Fig. 6. The securing rods 180 are desirably locked in position, after assembly, by transverse rods 210 passing through outer eye portions thereof, and with their ends, in turn, received in slots 220 in the lower mold block 161.

The mechanism is electrically operated automatically by means of the circuits, illustrated diagrammatically in Figures 11 and 12, upon pushing a button, which is used at the beginning of each press operation to start all the mechanism and cause it to function until the end of a cycle. There is also a button which is merely for starting the carriage motor 35, (Figure 1) which operates the press loading mechanism, if used, independently of the related press mechanism.

Upon pushing the first-mentioned button all parts of the mechanism operate in sequence to perform the various operations outlined, assisted by a suitable cam motor and associated mechanism, as described in said earlier application.

*Automatic operating cycle*

Before the cycle of operations is started, the upper and lower mold blocks 80 and 161 are heated by steam, admitted through the pipes 170 and 162, to the proper molding temperature, and the main switch (Figure 22 of the earlier application) is closed, as well as the knife switch 214 and the snap switch 215 (Figure 11). This energizes the power lines, which in the present instance may be those of a three-wire, 110-220 volt alternating-current system and the 110 volt alternating-current power lines 251 and 272.

The green signal lamp 273 is always energized, when the knife switch 214 is closed, by circuit from power line 272 through lines 274 and 275, lamp 273, lines 276, 277 and 278, to power line 251. This green lamp is, therefore, merely an indication that the power is on. Red lamps 279 and 281, however, are at the beginning of the cycle also energized to show that the upper mold element or head 99 is in open or tilted position. The circuit to these lamps is from power line 272 through lines 274 and 275, red lamp 279, lines 282 and 283, mercury switch 284, which is in the closed position shown in full lines, when the head 99 is tilted as shown in dot-dash lines in Figure 1, lines 285 and 253, snap switch 215, and line 252, to power line 251. The red lamp 281 operates in parallel with the red lamp 279, from line 283 through line 286 and from power line 272 through line 271, snap switch 215, and lines 269 and 287.

The automatic operating cycle starts when the push button 156 (Figure 22 of the earlier application) is depressed or closed, at which time it is assumed that the press is open as shown in dot-dash lines in Figure 1, and unloaded. Depressing said button closes a circuit to effect automatic loading of the press, as described on pages 19 and 20 of said earlier application.

After the return of the loading board to position beneath its loading hopper 32, and the charging of said loading board with a new batch of pellets 31, the cam 248 (Figure 1) on the operating shaft 37 momentarily closes the normally open switch 249, to start the closing operation of the loaded molding press. The cam 247 on the same shaft, simultaneously or just after starting the molding press, momentarily opens normally closed switch elements to stop the carriage motor 35 and return its operating circuits to initial positions.

The closing of switch 249, either automatically as described in said earlier application, or by hand if the pellets 31 are manually loaded, by the use of starting button 250, in parallel with the switch 249, initiates a circuit from power line 251 (Figure 11) through line 252, snap switch 215, lines 253, 298 and 254, switch 249; lines 255, 256, 257, mercury switch 258 on one of the side plates 100 of tilting head 99, (which is closed because of the tilted or rearward position of said head) lines 259, 261, and 262, relay coil or solenoid 265 of line starter 266, lines 267, 268 and 269, snap switch 215, and line 271 to power line 272. The stop button 260 is used like the stop switch "J" of the Makenny et al. patent, No. 2,197,528, previously referred to, to cause the press to open, as in case of emergency.

Closing of the line starter 266 initiates a circuit from power line 272 through lines 274 and 289, solenoid 291, of timing clock 109, to reset the clock for a predetermined timing period, as by releasing and allowing its pointer or hand 292 to move, as by spring pressure, from the zero position shown in full lines to the set position shown in dotted lines, thereby preparing it to time the molding operation. The circuit continues from solenoid 291 through lines 293, 294, 295, 296, and 297, through the left hand contact of line starter 266, lines 298, 253, snap switch 215, and line 252 to power line 251.

The control means of Figure 12 is designed to be electrically connected into the control means of Figure 11 to act as the lower mold elements 47 are moved vertically upward to pressure-engaging position with the upper mold elements 98, as shown in Figure 7, and pass current through solenoid 335 to pull the water valve operating handle 322 to its initial position at the left, thereby exhausting the water from the cylinder 173 through pipe 177 to pipe 346, while still maintaining the water pressure in cylinders 171, causing the lower mold elements 47 to move vertically downward a sufficient distance to permit the gases in the interior of the moldable material, including that pushed into the upwardly-opening pockets of the lower mold element parts 50 by the depending prongs on the upper mold elements 98, to be vented, and then to pass a current through solenoid 319 to pull the valve operating handle 322 again to the right, causing the lower mold elements to move upwardly again into pressure molding contact with the upper mold elements 98, as shown in Figure 9, the two operations being performed within a time interval of about thirty (30) seconds. Energization of clock motor 327 also occurs and the control means of Figure 11 completes its desired subsequent sequence of operations.

The "breathing cycle" control means of the present invention consists of a motor 503 (Figure 12) driving shaft 504 on which are located cams 505, 506, 507, 508, and 509 for actuating spring contacts or switches 515, 516, 517, 518 and 519 in predetermined sequence during one revolution of shaft 504; a relay 521, and electrical circuits including a mercury switch 554 (Figure 11) on one of the side plates 100 to limit energization of motor 503 to a time interval commencing with the attaining of full forward position of tilting head 99, and electrical circuits including said spring contacts 515 to 519, inclusive, (Figure 12) for modifying the circuit of the control (Figure 11) and successively energizing the solenoids 319 and 335 to actuate the water valve handle 322, first in a direction to lower the mold elements 47 from their highest position and then in a direction to return them to their highest position, while maintaining inoperative the solenoids 299 and 351 for the air valve operating handle 301, during the time interval required to accomplish this result, and then re-establish the control circuit of Figure 11.

For convenience of installation, motor 503, drive shaft 504, the cams 505 to 509, inclusive, and the spring contacts 515 to 519, inclusive, with relay 521, are assembled in a single compartment 530 (Figure 1). The electrical conductors therefrom are brought out to a contact plug 522 and the plurality of electrical conductors completing the circuits including a mercury switch are extended to a complementary socket 523. This arrangement facilitates the use of the press with or without the "breather control" means of the present invention.

When the plug 522 is in the socket 523, the knife switches 214 and 520 (Figures 11 and 12) closed, and power applied to lines 255 and 254 (as by closing starter button 250 if automatic loading is not used), current passes from power line 251, along line 252, through snap switch 215, along line 253, switch 250, along lines 255, 524 and 525, through engaging socket 523 and plug 522 to lines 526, 527, 528, spring contact 519 (normally held closed by cam 509 in first or rest position) thence through lines 529 and 531 to terminal 532 of relay 521, through relay coil 533 to terminal 534, through lines 535, 536, 537 and 538, on through knife switch 520 to connect through lines 539, 541, plug 522, socket 523, lines 542, 306, 269, snap switch 215, and line 271, to the other power line 272, thus completing the circuit and closing relay contacts 543, 544 and 545.

Simultaneously with the resetting of the clock 109, previously referred to, the head or upper mold element 99 starts to move forward from the position shown in dot-dash lines in Figure 1, on the admission of air from compressed air supply line 290 to the pipe 106 by energization of the solenoid 299 moving the air valve operating handle 301 to the right from the position shown in Figure 11. The operating circuit for effecting this movement is from power line 251, through line 252, snap switch 215, lines 253 and 298, right hand contact of line starter 266, lines 302 and 303, solenoid 299, lines 304, 546, socket 523, plug 522, lines 547, 548 and 549, spring contact 517, (initially held closed by cam 507) lines 551, 552, and 553, plug 522, socket 523, lines 542, 306 and 269, snap switch 215, and line 271 to power line 272.

Completion of the electrical circuit to energize the motor 503 occurs upon the movement of upper mold element 99 to fully advanced position to close the mercury switch 554, secured to plate 100. The circuit to operate the motor 503 is from power line 251 through line 252, snap switch 215, lines 253, 298, 254, 555, 556, 557, 558, switch 520, line 559, switch 544, lines 561, 562, 563, 564 and 565, plug 522, socket 523, lines 566, 567, 568, 569, mercury switch 554, lines 571, 572, 573 and 574, socket 523, plug 522, line 575, motor 503, lines 576 and 538, switch 520, lines 539 and 541, plug 522, socket 523, lines 542, 306, 269, snap switch 215, and line 271 to power line 272.

When the head 99 has been moved to the vertical position, or directly above the lower mold elements 47, the red lamps 279 and 281 are de-energized, the lower mold elements rise until they engage the upper mold elements as shown in Figure 7. The clock 109 simultaneously starts timing the molding operation. The clock timing period is so adjusted that it makes allowance for the time the mold elements 47 take to actually rise into engagement with the head 99 or mold elements therein, as well as the "breathing cycle," so that the moldable material is kept pressed, subject to the steam heating operation, for a predetermined desirable length of time.

The circuits for effecting these operations are from power line 251, through line 252, snap switch 215, lines 253 and 285, switch 307, (closed momentarily by the clockwise tilting of the switch lever 308 pivoted to stationary supporting frame 309 as indicated at 310), line 315, mercury switch 316, (which closes as the upper mold element reaches its forward position), lines 317, 318 and 593, solenoid 319, lines 321, 542, 306, and 269, snap switch 215, and line 271 to power line 272.

The lever 308 is tilted, to the dotted position shown in Figure 11, by the engagement of arm 311 therewith, (which arm is carried by crank 110 on one of the trunnions 120), as the head 99 reaches the forward or vertical position, as shown in Figure 1. The tilting of said lever 308 to the dotted position also opens mercury switch 284 (de-energizing the red lamps 279 and 281) and closes mercury switch 325, both carried thereby. The lever 308 carries a tip member 312 pivoted at 313, so that it causes closure of the switch 307 only when swinging clockwise, or moving from right to left, as viewed in Figure 11. The tip member 312 swings clockwise or to the left, out of the way, without performing any other function, when the lever 308 moves back from dotted to full line position. The arm 311 actuates the lever 308 by engagement with a crank arm 314 extending from the latter.

Energization of the solenoid 319 pulls the water valve operating handle 322 to the right, as viewed in Figure 11, to cause water to flow from supply line 323 through the valve and line 177 to the cylinder 173 (Figure 10) under the piston 174 to lift the lower mold elements 47 into engagement with the upper mold elements 98 supported on the head 99, closing the mold against the lesser force of water pressure on the pistons 169 in cylinders 171, supplied through branch pipe 178, which in this case act as cushioning means.

Timing movement of the clock is effected by energization of the clock motor 327 from power line 272 through line 271, snap switch 215, line 324, mercury switch 325, (now closed by the carrying lever 308 being in its dotted position), line 326, clock motor 327, and lines 328 and 278 to power line 251.

The schedule for opening and closing the spring contacts 515 to 519, inclusive, is shown in Figure 3. A few seconds after the cycle control motor 503 starts contact 518 closes. This contact is in parallel with the relay contact 544. Toward the end of the cycle, contact 519 opens. When this contact opens the relay coil 533 is de-energized and opens contact 544. The cycle control motor 503, however, continues to run, being energized through contact 518, the circuit being the same as that described for operating the motor 503 initially except that the lines 577, 578, 579, 581 and contact 518 replace lines 559, switch 544, lines 561, 562, and part of 563. At the end of the cycle, contact 518 opens causing the motor 503 to stop and putting everything exactly as it was prior to starting, that is, with the cycle control in its original starting position.

Immediately after the cycle control motor 503 starts, contact 517 is broken. This had formed a connection between lines 542 and 546. Line 542 is a common line to supply 110 volt current to the solenoids operating the tilting head of the molding press, so that when this contact opens the solenoids for the valve operating the tilting head air cylinders cannot be energized. Therefore, as long as contact 517 is open the press must remain in a vertical position, that is with the tilting head 99 advanced and disposed over the lower mold elements. The cycle control cannot be operated when this tilting head is in the back position due to the mercury switch 554 which would then disconnect lines 566 and 574.

The foregoing safety feature is stressed because it is a vital point in the installation of a control of this nature in a molding press, as without it the entire press could be very easily wrecked, due to the bottom mold section 161 coming up with the head 99 of the press away from the vertical position.

Contact 516 is connected, through socket 523, plug 522, lines 557, 558, switch 520, lines 577, 578, 579 and 581, to line 556 which goes through lines 555, 254, 298, 253, snap switch 215, and line 252 to power line 251. It also connects through lines 570, 589, 590, plug 522 and socket 523 to line 582, which connects through lines 583, 584, and 585 to the solenoid 335 operating the handle of the hydraulic valve 322 for lowering the bottom section 161 of the mold. This contact, in the preferred embodiment disclosed, closes approximately 7 seconds after the cycle control motor 503 starts, at which time the mold is almost closed, that is, the molds are almost in tight engagement about the plastic material. When contact 516 closes, it completes the circuit from its connection to the power line 251, previously traced, back through solenoid 335 along the circuit, as previously traced, and on through lines 587, 342, 341, 326, mercury switch 325, line 324, snap switch 215, and line 271 to power line 272, to cause the mold to open and the bottom section to drop approximately 1 inch.

At this point contact 516 opens, as it is only desirably closed approximately ¼ of a second, and contact 515 closes. This de-energizes solenoid 335 and energizes solenoid 319 which pulls the handle of valve 322 to the right and raises the bottom section 161 of the mold. The same then remains closed for the duration of the actual molding-curing cycle, which may be approximately 1¾ minutes. The operating circuit for solenoid 319 is from power line 251, through line 252, snap switch 215, lines 253, 298, 254, 555, 556, socket 523, plug 522, lines 557, and 558, knife switch 520, lines 577, 578, 579 and 581, contact 515, lines 588, 589, 591, plug 522, socket 523, lines 592 and 593, solenoid 319, lines 321, 542, 306 and 269, snap switch 215, and line 271 to power line 272.

The total time that the "breathing cycle" control operates is desirably 30 seconds, therefore the cycle control is stopped long before the mold press has gone through its curing cycle for the material being molded. If it is desired to cut out the cycle control without disconnecting the plug 522 from the socket 523, the switch 520 may be opened. The light 586 is used as a means of indicating when the control is actually in operation and remains on as long as the relay 521 is energized.

It will be readily seen that the press will not operate when contact 517 is open. This is regardless of whether the switch 520 is opened or closed and whether or not the cycle control unit is connected to the press. Therefore, when the cycle control unit is not connected to the press, a short circuit means, such as a plug (not shown) must be inserted in the socket 523 to bridge the lines 542 and 546.

After the lower mold elements 47 engage the upper mold elements 98, as shown in Figure 9, and the timing pointer 292 reaches its initial or zero position, shown in full lines in Figure 11, at the end of the predetermined timing period, it closes a circuit through contact 334 which energizes the counter 331 and adds one to the number recorded thereon. The circuit for this purpose is from power line 272 through line 271, snap switch 215, line 324, mercury switch 325, lines 326 and 332, counter 331, line 333, pointer 292, contact 334, and lines 328 and 278 to power line 251. This counter records the fact that a load of pressed members 501 has been finished in the machine.

At the same time that the counter is energized the lower mold element is started on its return travel to initial position by energization of the solenoid 335 to return the water valve operating handle 322 to initial position, thereby exhausting the water from the cylinder 173 through pipe 177 to pipe 346, while still maintaining the water pressure in cylinders 171. The energization of the solenoid 335 is effected only after the circuit through clock pointer 292 is completed to energize the relay coil or solenoid 336 of line starter 340. The circuit for effecting this energization is from power line 272 through line 271, snap switch 215, lines 269 and 306, solenoid 336, lines 337, 338, 339 and 333, pointer 292, contact 334 and lines 328 and 278 to power line 251. Closing of the line starter 340, completes the circuit from power line 272 through line 271, snap switch 215, line 324, mercury switch 325, lines 326, 341 and 342, solenoid 335, line 585, line starter 340, lines 344, 345, 298 and 253, snap switch 215, and line 252 to power line 251.

When the piston 174 reaches its lowermost position, under the action of the return pistons 169 operating in cylinders 171, the mercury switch 347 on the base of the machine is momentarily tripped or moved from the tilted position shown in Figure 11 to the horizontal closing position, by the actuating member 348 carried by one of the cross members 168. The member 348 has a pivoted tip portion 349 which engages the left end 350 of the switch carrier pivoted at 360 for this purpose. The tip portion 349 swings downwardly out of the way upon the upward or return movement of the lower mold elements, so that the switch 347 is only closed once upon each motion cycle of said lower elements.

Closing of the switch 347 completes a circuit from power line 272 through line 271, snap switch 215, lines 269, 306, and 542, socket 523, plug 522, lines 553, 552 and 551, contact 517 (held closed by cam 507 at end of cycle) lines 549, 548, 547, plug 522, socket 523, line 546, solenoid 351, lines 352, 353 and 354, mercury switch 347, lines 356, 344, 345, 298, and 253, snap switch 215, and line 252 to power line 251. Energization of the solenoid 351 returns the air valve operating handle 301 to the initial position illustrated in Figure 11, admitting air to pipe line 108 from supply line 290, and exhausting it from pipe line 106, to move the head 99, including the upper mold elements 98, to initial tilted position as shown in dot-dash lines in Figure 1.

As the head returns to said tilted position, the red lamps 279 and 281 are re-energized by the release of the crank arm 314 allowing the mercury switch 284 to close. At the same time the lever 357, carried on one of the side plates 190 swings back (toward the position illustrated in Figure 11) and engages the arm 358 of bell crank lever 359 pivoted at 361 on a base portion of the machine, and tilts the mercury switch 362 carried on a depending arm 363 thereof to closed position, against the action of return spring 364, thereby energizing (through lines marked X and Y) a relay coil or solenoid of a line starter for a control or cam motor, in order to raise the name plates 50, and effect removal of the molded articles 501 and cleaning of the molds. (See Figure 22 and description on pages 25 to 36, inclusive, of application previously referred to.)

*Cam construction for adjustment*

Cams 505 to 509, inclusive, as merely schematically illustrated in Figure 12, may be mounted on shaft 504 in adjusted relation with respect to one another to obtain the desired sequence of operations. One convenient way is shown in Figures 13 and 14, wherein cams 507, 508 and 509 are shown fixed on the shaft 504 in predetermined relation, whereas cams 505 and 506 are mounted for convenient adjustment with respect to one another and said fixed cams. This may be effected by securing cam 507 to a hub 596 as by means of screw 597, and cam 509 to a hub 598 and cam 508 by means of screw 599, intersecting said parts and threadingly engaging the hub 596. A single set screw 601 then serves to hold cams 507, 508, and 509 in predetermined fixed position on shaft 504.

Cam 506 is secured to a hub 602 by means of screw 603, said hub having hollow extension 604 around the shaft 504, carrying a disk 605. Likewise the cam 505 is secured to hub portion 606 by means of a screw 607, which hub portion has a hollow central extension 608, carrying a disk 609. The shaft 504 likewise carries a disk 611 held thereon by the set screw 612 which permits limited longitudinal sliding in key-way 613 in said shaft. The cams 505 and 506 are held in adjusted relation with respect to one another and the shaft 504 by means of a knurled lock nut 614 threaded on said shaft 504 and adapted to press the disks 611, 605 and 609 into frictional engagement with one another after proper angular relative adjustment.

The disk 609 is secured to hub extension 608 by set screw 615 and the disk 605 is secured to hub extension 604 by means of set screw 616, the latter having its inner end received in a key-way 617, permitting limited longitudinal movement therein after assembly. The desired angular relationship between the disks 605 and 609 is maintained by an indicator plate 618 fixed on the disk 609 and having a sharpened inner edge fitting in one of a series of notches 619 on the periphery of the disk 605. The disk 605 has fixed thereon an indicator plate 621 having a sharpened inner edge received in one of a series of notches 622 on the periphery of the disk 611. The disks 605 and 611 are both calibrated in degrees, as indicated at 623 and 624, to respectively show the angular relationship between the cams 505 and 506 and between the cam 506 and the shaft 504 with cams 507, 508 and 509 fixed thereon. A desired adjustment is effected by loosening nut 614, moving disk 611 out of engagement with plate 621 and disk 605 out of engagement with plate 618, turning the disks to the desired angular relationship and then tightening nut 614 to return and hold the parts in the desired relationship.

In the embodiment shown in Figure 13 shaft 504 is journaled in bearing 625 on the one hand and in hub 602 and extension 604 which in turn is mounted in hub 606 and extension 608, the latter being journalled in bearing 626. The right hand end of the shaft 504, as viewed in Figure 13, is motor driven rather than the left hand end, as viewed in Figure 12, it being understood that the showing in said last mentioned figure is merely diagrammatical.

Figure 2:
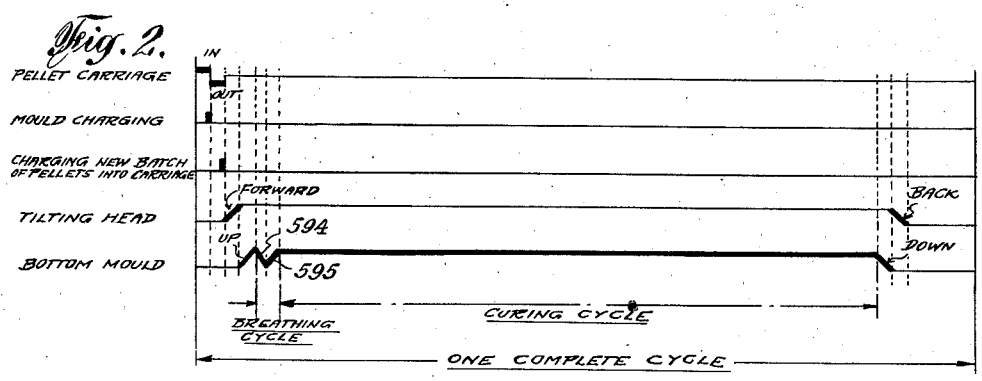
Fig. 2 is a diagram showing the sequence of one cycle of operations which occur in accordance with the present invention.

*Outline of operations with reference to Figure 2*

In order to start the automatic molding cycle, (assuming the press is open and the loading board 56 is under the loading hopper 32 and contains a load of pellets 31), steam is admitted to the upper and lower mold blocks 80 and 161 through the pipes 170 and 162 to heat them to the desired molding temperature, and the main switch and switches 214 and 215 are closed, energizing the green lamp 273 and the red lamps 279 and 281. The green lamp indicates that the power in on and the red lamps (which may be positioned at desired locations) that the press is open.

The starting switch or button may now be closed, operating a line starter to initiate a circuit shunting the starting button line circuit, and making it unnecessary for operation to keep the starting button depressed.

Another line starter then closes, as well as an associated switch, which starts the carriage motor 35, and maintains the operation thereof for the required period of time.

This situation is represented in Figure 2 by the upper line, or that after "pellet carriage," showing that said carriage first moves in to load the mold and then out after the mold has been charged, as indicated by the second line, or that after "mold charging." After return, a new batch of pellets is placed in the carriage, as shown by the third line, or that marked "charging new batch of pellets into carriage."

After the press has been loaded and the board 56 returned for recharging, switch 249 is momentarily closed by the cam 248 to close the line starter 266 for operation of the press 48, and the switches 233 and 235 momentarily opened to stop the carriage motor and return the operating circuits therefor to initial positions.

Closing the line starter 266, effects resetting of the timing clock 109 to fix the duration of the molding operation, and starts the forward movement of the head and upper mold elements. When the tilting head reaches a vertical position, or one directly above the lower mold elements, the red lamps 279 and 281 are put out to indicate that said head has moved forward. This operation is indicated in the fourth line of Figure 2, or that after "tilting head," showing that it moves forward before the bottom mold elements move up, which latter operation now starts as indicated on the fifth line, or that after "bottom mold." The "breather cycle" control of Figure 12 now becomes effective, causing the bottom mold elements to momentarily drop, as indicated at 594, and then again rise, as indicated at 595.

As the bottom mold elements rise to close the mold, the clock 109 starts the timing operation. This means that the mold is held closed, after completion of the "breather cycle," in the absence of an emergency use of the stop button 260, until the moldable material has been compressed in the steam heated mold for the desired length of time.

At the end of the timing cycle, a circuit is initiated by the clock 109, through its contact 334, which energizes the counter 331, and the lower mold element then moves to open position or down, as indicated on said fifth line or Figure 2, followed by a backward or tilting movement of the head, as indicated on the fourth line of said figure.

As the tilting head or upper mold elements move to open or rearward position, the red lamps 279 and 281 are re-energized and a momentary closing of the switch 362 results to operate a line starter for a time-delay relay. This time-delay relay effects operation of a cam motor, beginning at about the end of the rearward movement of the tilting head, closing a switch to provide a holding circuit to keep it going. Further movement of the motor closes another switch to cause the name plates 50 to rise, in order to effect removal of the molded articles 501.

Summarizing the foregoing operations, we have the following sequence:

1. Admit steam to upper and lower mold blocks 80 and 161 and open hydraulic and air line valves.
2. Close main switch and operating switches 214 and 215 to energize green and red lamps and apply power to operating lines.
3. Push starting button 156.
4. Line starter 227 closes.
5. Starting button circuit shunted.
6. Line starter and associated switch closes, starting carriage motor 35 to cause the press to be loaded with preferably generally spherical pellets of moldable material and the loading board returned for recharging (if automatic loading is used).
7. Switch 249 (or 250, if automatic loading is not used) momentarily closed to operate line starter 266 for the press 48.
8. Switches 233 and 235 momentarily opened to stop carriage motor 35.
9. Timing clock 109 reset.
10. Upper mold elements move forward.
11. Red lamps de-energized.
12. Lower mold elements move up.
13. Clock 109 starts the timing operation.
14. Lower mold elements move down in "breather cycle" and promptly return.
15. Moldable material compressed for the desired length of time.
16. Counter energized.
17. Lower mold elements move down.
18. Head tilts backward to open position.
19. Red lamps re-energized.
20. Cam motor started through time-delay relay.
21. Switch closes to provide motor holding circuit.
22. Name plates rise to eject molded articles 501.
23. Name plates lowered.
24. Switch closes to put circuits in condition for restarting.
25. Switch opens stopping cam motor and returning mechanism to initial position.

In view of the foregoing, it will be seen that we have provided mechanism for taking pellets of moldable material from a hopper, feeding them to a molding machine, and automatically removing them from said machine when finished, without any intermediate handling or attention on the part of the operator.

It will also be seen that we have provided interlocks for preventing the upper mold head from swinging back, as well as preventing the mold from closing when damage might ensue if such operations occurred, signal lights for showing when the power is on and when the mold is open, as well as means for operating the molding mechanism independently of the feeding mechanism.

Although a preferred embodiment of our invention has been disclosed, it will be understood that modifications may be made within the spirit and scope of the appended claims.

We claim:
1. Apparatus for automatically molding and breathing plastic material comprising an upper mold member, a lower mold member, means mounting said mold members so that they are movable between pressing and disengaging positions, a switch so positioned on said mounting means that it is open when a mold member is in disengaging position and closes when it is moved to pressing position, control mechanism including said switch and electrical circuit means for pressing the mold members together about plastic material therein and after a predetermined period returning them to disengaging positions, breathing cycle control mechanism comprising a shaft, a plurality of cams thereon, electrical switch devices which are opened and closed by said cams as turned with said shaft, a motor for driving said shaft at a desired speed, and wiring connecting said motor and switch devices to the circuit of said control mechanism, so that as a mold member is moved to pressing position said switch is closed to energize said motor and cause successive opening and closing of said switch devices whereby; first, as a safety measure a switch device is opened breaking a circuit of the control mechanism to keep the first-mentioned mold member in pressing position; second, after the other mold member has moved almost to tight engagement with respect to said first-mentioned mold member about plastic material therein, a switch device is closed momentarily to cause it to disengage for a breathing period; third, another switch device is closed to cause said other mold member to return after said breathing period to tightly engage said first-mentioned mold member about said plastic material for a completion of the molding cycle, and means for then separating said mold members.

2. Apparatus for automatically molding and breathing plastic material comprising an upper mold member, a lower mold member, means mounting said upper mold member so that it is swingable forwardly over and rearwardly from the lower mold member, a switch so positioned on said mounting means that it is open when said upper mold member is retracted and closed when it is swung forwardly over the lower mold member, means mounting said lower mold member so that it is movable up to and down from the upper mold member when in said forward position, control mechanism including said switch and electrical circuit means for swinging the upper mold member forward over the lower mold member and after a predetermined period returning it to normal position, means for moving the lower mold member to compress plastic material therein against the upper mold member when the latter is in forward position, and breathing cycle control mechanism comprising a shaft, a plurality of cams thereon, electrical switch devices which are opened and closed by said cams as turned with said shaft, a motor for driving said shaft at a desired speed, and wiring connecting said motor and switch devices to the circuit of said control mechanism, so that as the upper mold member is swung forward over the lower mold member its switch is closed to energize said motor and cause successive opening and closing of said switch devices whereby; first, as a safety measure a switch device is opened breaking a circuit of the control mechanism to keep the swingable upper mold member in forward operating position over the lower mold member; second, after the lower mold member has moved up almost to tight engagement with respect to said upper mold member about plastic material therein, a switch device is closed momentarily to cause it to drop for a breathing cycle; third, another switch device is closed to cause said lower mold member to return after said breathing cycle to tightly engage said upper mold member about said plastic material for a completion of the molding cycle, and means for then lowering said lower mold member to normal position.

3. Apparatus for automatically molding and breathing plastic material comprising an upper mold block, a lower mold frame, a plurality of upper mold elements in said block, a corresponding number of lower mold elements in said frame, each of said lower mold elements comprising a shell portion and a lower portion provided with an upwardly opening pocket to form a lug portion on an article to be molded, means mounting said upper mold block so that it is swingable forwardly over and rearwardly from the lower mold elements, a switch so positioned on said mounting means that it is open when said upper mold block is retracted and closes when it swings forwardly over the lower mold elements, means mounting said lower mold frame so that it is movable up to and down from the upper mold elements when in their forward position, control mechanism including electrical circuits and said switch, manually operable means for energizing said control mechanism to start automatic operation of the apparatus, mechanism operable under said control mechanism for delivering plastic pellets simultaneously to all of said lower mold elements, means for swinging the upper mold block forward over the lower mold elements and after a predetermined time period returning it to normal position, a timing device in circuit with said control mechanism to determine said period, means for moving the lower mold frame to compress plastic material in the lower mold elements against the upper mold elements when the latter are in forward position, and breathing cycle control mechanism comprising a shaft, a plurality of cams thereon, electrical switch devices which are opened and closed by said cams as turned with said shaft, a motor for driving said shaft at a desired speed, and wiring connecting said motor and switch devices to the circuits of said control mechanism, so that as said upper mold elements are swung forward over the lower mold elements, its switch is closed to energize said motor and cause successive opening and closing of said switch devices, whereby; first, as a safety measure a switch device is opened breaking a circuit of the control mechanism to keep the swingable upper mold block in forward operating position over the lower mold elements; second, after the lower mold elements have moved up almost to tight engagement with respect to said upper mold elements about the plastic material, and the timing device has started, a switch device is closed momentarily to cause the lower mold elements to drop for a breathing cycle; third, another switch device is closed to cause said lower mold elements to return after said breathing cycle to tightly engage said upper mold elements about said plastic material for a completion of the molding cycle, means for then lowering said lower mold elements to normal position, and means to raise the lower portions of said lower mold elements with respect to the shell portions thereof to lift articles molded for removal from the apparatus.

4. Apparatus for automatically molding plastic material comprising an upper mold block and a lower mold frame, a plurality of upper mold elements in said block and each provided with a depending prong, a corresponding number of lower mold elements in said frame and each comprising a shell portion and a lower portion provided with an upwardly-opening pocket to receive the prong of the registering upper mold element and form a hollow lug portion on an article to be molded, means mounting said upper mold block so that it is capable to being swung forwardly over and rearwardly from the lower mold elements, a switch so positioned on said mounting means that it is open when said upper mold member is retracted and closed when it is swung forwardly over the lower mold member, means mounting said lower mold frame so that it is capable of being moved up to and down from the upper mold elements when in their forward position, electrical mechanism for automatically controlling said apparatus, manually operable means for energizing said electrical mechanism to start automatic operation of the apparatus, mechanism operable under the control of said electrical mechanism for delivering plastic pellets simultaneously to all of said lower mold elements, means for swinging the upper mold elements forward over the lower mold elements and after a predetermined time period returning them to normal position, a clock to time said period, means for moving the lower mold elements up to compress said pellets against the upper mold elements when the latter are in forward position to cause the prongs on the upper mold elements to partially enter the pockets in the registering lower mold elements to begin the formation of the lug and other portions of the articles being molded, means for then lowering the lower mold elements momentarily, to allow for the escape of gases trapped in said lower mold elements and in said pockets by the prong portions, and again raising them to fully compress the partially-formed plastic material against the upper mold elements while the latter are still in forward position, said momentary lowering and raising means comprising a shaft, a plurality of cams thereon, electrical switch devices which are opened and closed by said cams as turned with said shaft, a motor for driving said shaft at a desired speed, and wiring connecting said motor and switch devices to the circuit of said control mechanism, so that as the upper mold member is swung forward over the lower mold member its switch is closed to energize said motor and cause successive opening and closing of said switch devices whereby; first, as a safety measure a switch device is opened breaking a circuit of the control mechanism to keep the swingable upper mold member in forward operating position over the lower mold member; second, after the lower mold member has moved up almost to tight engagement with respect to said upper mold member about plastic material therein, a switch device is closed momentarily to cause it to drop for a breathing cycle; third, another switch device is closed to cause said lower mold member to return after said breathing cycle to tightly engage said upper mold member about said plastic material for a completion of the molding cycle, means operating after said timed period for moving said lower mold elements down to normal position, and means to raise said pocket-carrying portions in the shell portions of said lower mold elements and lift said articles therefrom for removal.

JAMES B. WHITMORE.
WILLIAM MAKENNY.
FRANK A. NEWCOMBE.

REFERENCES CITED

The following references are of record in the file of this patent:

UNITED STATES PATENTS

| Number | Name | Date |
| --- | --- | --- |
| 1,851,247 | Hall | Mar. 29, 1932 |
| 1,904,155 | Malec | Apr. 18, 1933 |
| 2,050,825 | Bissell | Aug. 11, 1936 |
| 2,096,182 | Kerr et al. | Oct. 19, 1937 |
| 2,128,417 | Kerr | Aug. 30, 1938 |
| 2,160,805 | Winegar | June 6, 1939 |
| 2,193,395 | Dewey Jr. | Mar. 12, 1940 |
| 2,197,528 | Makenny et al. | Apr. 16, 1940 |
| 2,222,732 | Winegar | Nov. 26, 1940 |
| 2,242,189 | Zelov et al. | May 13, 1941 |